United States Patent [19]

Doucet

[11] 4,364,882

[45] Dec. 21, 1982

[54] PROCESS AND AN APPARATUS FOR THE EXTRUSION OF PLASTIC PIPES WITH COMPOSITE WALLS

[75] Inventor: Marcel Doucet, Paris, France

[73] Assignee: Societe Generale de Canalisations Sogecan, Paris, France

[21] Appl. No.: 147,945

[22] Filed: May 8, 1980

[30] Foreign Application Priority Data

May 10, 1979 [FR] France ................. 79 12515

[51] Int. Cl.³ ............................................. B29D 27/00
[52] U.S. Cl. .................................. 264/45.9; 264/46.1;
264/171; 264/209.4; 264/209.8; 425/133.1;
425/325; 425/462
[58] Field of Search ...................... 264/45.9, 46.1, 171,
264/177 R, 209.4, 209.8; 425/133.1, 325, 462

[56] References Cited

U.S. PATENT DOCUMENTS

| 2,501,690 | 3/1950  | Prendergast     | 264/177 R X |
| 3,300,554 | 1/1967  | Bachus          | 264/45.9    |
| 3,609,809 | 10/1971 | Slicker         | 264/209.8 X |
| 3,956,438 | 5/1976  | Schippers       | 264/46.1    |
| 4,054,403 | 10/1977 | Hornbeck et al. | 264/45.9 X  |

FOREIGN PATENT DOCUMENTS

| 2732866 | 1/1978 | Fed. Rep. of Germany | 264/45.9 |
| 39-2071 | 2/1964 | Japan                | 264/45.9 |
| 954069  | 4/1964 | United Kingdom       | 264/45.9 |
| 251196  | 6/1970 | U.S.S.R.             | 425/325  |

Primary Examiner—Philip E. Anderson
Attorney, Agent, or Firm—McDougall, Hersh & Scott

[57] ABSTRACT

The invention relates to a process and an apparatus for manufacturing plastic pipes having a composite structure by extrusion.

The material forming the inner and outer walls of the tube is introduced into a special heated and regulated distribution head and is separated into two distinct streams between which a filling material forming a first stream is injected. These three streams are brought together and placed in contact, thus forming a blank which is given its final dimensions by being passed into a conventional tool comprising a trefoil, die and mandrel, followed by a conformator.

Application to the manufacture of large dimension tubes for the disposal and drainage of sewage and rainwater.

8 Claims, 1 Drawing Figure

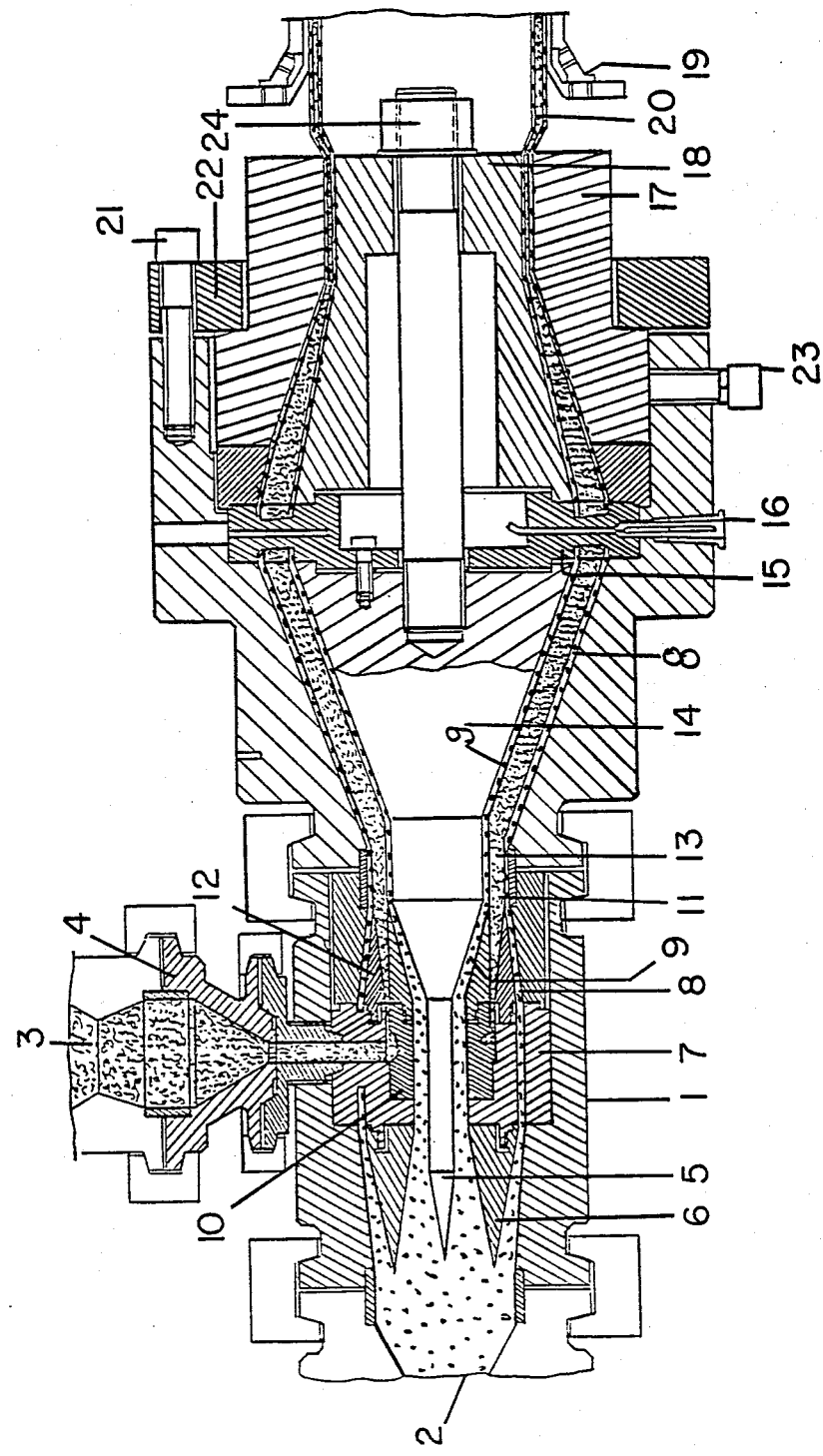

PROCESS AND AN APPARATUS FOR THE EXTRUSION OF PLASTIC PIPES WITH COMPOSITE WALLS

The present invention relates to a process and an apparatus for the extrusion of plastic pipes with composite walls and, more particularly, large dimension plastic pipes.

Plastic pipes are currently used for forming underground pipe lines due to their lightness, their easy positioning and connection and their corrosion resistance. However, the price becomes prohibitive when reaching the large dimensions needed for draining sewage or rainwater.

Attempts have already been made to lighten these pipes while maintaining sufficient rigidity and resistance to crushing by various means such as by using corrugated walls, forming the tube by winding a partitioned shaped section into a spiral then sticking or welding it, or by using rigid cellular plastic.

The latter possibility forms the subject, in particular, of French Pat. Nos. 1,498,620, 1,545,573 and certificates of addition Nos. 94.122, 94.389 and 2,063,589. The product is formed by an expanded plastic foam core whose density increases gradually from the core to the periphery and by a smooth wall is a thin skin having a thickness of from 0.1 to 0.3 mm. Such pipes are subject to surface errosion, are relatively fragile and, due to internal tensions, are subject to significant dimensional variations when brought to a high temperature.

It is also known to manufacture plastic tubes having a composite structure, whose wall is formed from two or three layers of different natures by coextrusion in special dies. This technique is described, for example, in the work "Techniques de l'Ingenieur", volume A9, article A3652, pages 137-138. It is carried out by combining the various layers in their final dimension at the level of the extrusion die. It is thus necessary to provide the same number of extrusion tools as there are dimensions of pipes and layers and this increases the production costs considerably.

The present invention relates to a process for manufacturing by extrusion plastic pipes having a composite structure which are formed by two walls enclosing a filling material which adheres to the said walls, in which is introduced, in a heated and regulated distributing head, the material constituting the pipe walls, the flow is separated into two separate streams between which the filling material forming a third stream is injected, the three streams are brought into contact, thus constituting a three layered composite with its final structure, which is given its final shape and sizes by passage in a tool comprising a trefoil, die and mandrel followed by a conformator, characterised in that the composite passes over a diverging outlet cone placed between the distributing head and the wobbler of the tool.

The present invention also relates to an apparatus for carrying out the above process, comprising
 (a) a heated and regulated distributing head which is supplied, on the one hand, with a first extruder which introduces the material constituting the inner and outer walls, and on the other hand, with a second extruder which introduces the filling material;
 (b) a means of separating the material constituting the inner and outer walls into two distinct streams;
 (c) a means of introducing the filling material between these two streams;
 (d) a means of bringing the three streams together and placing them in contact to form the composite with its final structure;
 (e) heated and regulated tool which gives the composite its final shapes and sizes,
characterised in that it comprises a diverging outlet cone arranged at the outlet of the distributing head.

The process and the apparatus allow the manufacture of extruded plastic tubing of composite structure in which the filling material is formed by an expanded plastic foam.

FIG. 1 shows the assembly of the apparatus for carrying out the process.

The distributing head 1 is supplied, on the one hand, with plastic 2 through an extruder of the conventional type (not shown) which is located upstream and, on the other hand with filling material 3 through a second extruder 4. The central cone 5 allows the tube to be formed in a known manner. The annular part 6 which is integral with the trefoil 7 causes separation into two distinct streams 8 and 9 of the cylinder of plasticised material leaving the extruder 2. The trefoil 7 is heated and regulated in temperature in a known manner.

The filling material 3 leaving the extruder 4 is injected through a branch of the trefoil 7 into a conventional distribution core with a variable charge loss 10. At the core outlet, the material attaches itself at a constant rate of advance to the entire periphery of the core between the two streams 8 and 9, then the three elements: streams 8, 9 and filling material 3 which forms a third stream 11 are combined by the device 12 to form the three-layered plastic composite 13. The flow rate of the two extruders must be controlled with regard to the proportion of a quantity of fluxes of the two materials (walls and filling) defined by the outlet sections of the streams. When the filling material 3 is an expandible plastic foamable material, the expansion cannot yet take place at this level due to the high pressure prevailing there.

At the outlet of the distribution head, the composite has its final structure with regard to the mass distribution of the three streams, and this distribution will be maintained to the outlet of the extrusion tool. The three-layered composite 13 formed in this way is then brought to its final state and dimensions. It travels over the diverging outlet cone 14 then through a second trefoil 15 which is heated and regulated by the probe 16 and is finally shaped between the die 17 and the mandrel 18.

The passage over the diverging outlet cone allows the composite to receive a dimension which is larger than that of the final pipe then, after passing over the trefoil whose branches produce separation in the streams, allows the re-welding of the composite in the converging zone of the die to take place and thus allows a perfectly homogeneous pipe with smooth internal and external surfaces which are free from defects to be obtained.

The composite leaving the tool is then calibrated and cooled by a conventional gauge 19, either an air pressure gauge if there is no significant expansion of the composite or a reduced pressure gauge if the composite expands significantly in diameter and thickness in the particular case where the material 3 is an expandible material. In this case, it is necessary to provide adequate space between the tool outlet and the gauge for the expansion of the internal plastic foam and of both the external stream 8 and internal stream 9 forming the inner and outer walls to have time to take place.

In order to change the dimensions of the tube 20, it is sufficient to change the die 17 and the mandrel 18 which are simple and strong parts held and positioned in a known manner by gripping and control means 21, 22, 23 and 24.

The streams 8 and 9 forming the inner and outer walls of the tube can be formed by and extrudible thermoplastic material and, in particular, by polyvinyl chloride, polyethylene, propylene, polystyrene.

The filling material 3 can advantageously be a lightened material such as an expandable plastic foam selected for its compatibility with the material constituting the walls. In fact, it is essential for sufficient adhesion to be established between the walls and the filling so as to ensure the cohesion of the composite structure. These expandable foams include derivatives of polyvinyl chloride, polystyrene, polyethylene and polypropylene.

A wide variety of organic or mineral substances could also be used providing that they were incorporated into a mass of thermoplastic material which can be hot welded to the walls 8 and 9.

Embodiment

Using tools which are identical to those in FIG. 1 (corresponding to an approximate scale of 1/5), a number of tubes made of rigid polyvinyl chloride (density 1.4) were produced, with an (expanded) cellular polyvinyl chloride filling material having an average density of 0.5. It should be noted that, unlike the pipes formed by an expanded plastic foam with a thin smooth skin in which there is a density gradient between the core and the smooth skin forming the external wall, the filling material has a substantially homogeneous density. Composite pipes having the following characteristics were obtained, compared with those of conventional rigid PVC pipes with a solid wall and the same external diameter.

| CONVENTIONAL PIPES | | |
| --- | --- | --- |
| External Diameter in mm | Wall Thickness in mm | Weight per Meter in kg |
| 110 | 3.2 | 1.5 |
| 125 | 3.2 | 1.714 |
| 160 | 3.8 | 2.61 |
| 200 | 5 | 4.29 |
| 250 | 6.3 | 6.75 |
| 315 | 8 | 10.8 |
| 400 | 10.5 | 18 |

| COMPOSITE PIPES PRODUCED ACCORDING TO THE INVENTION | | | | | |
| --- | --- | --- | --- | --- | --- |
| External Diameter in mm | Thickness of each wall in mm | Thickness of filling material in mm | Total thickness in mm | Weight per meter in mm | Gain in weight relative to conventional tubes % |
| 110 | 0.75 | 2.5 | 4 | 1.1 | 26 |
| 125 | 0.75 | 3 | 4.5 | 1.36 | 20.6 |
| 160 | 0.80 | 3.4 | 5 | 1.82 | 30 |
| 200 | 1 | 4.5 | 6.5 | 3.07 | 28.4 |
| 250 | 1 | 6.5 | 8.5 | 4.62 | 31.5 |
| 315 | 1.25 | 9 | 11.5 | 7.63 | 29.3 |
| 400 | 1.50 | 11 | 14 | 11.77 | 34.6 |

Measurement of the resistance to crushing by conventional tests demonstrated the superiority of the pipe according to the invention ranging from 5 to 20% relative to the conventional pipe according to the diameters considered. The conventional assembly by coupling could be carried out easily without modifying the tools and the mode of operation.

The pipes obtained using the process and apparatus forming the subject of the invention are particularly well suited to the manufacture of underground pipe lines for hygiene and drainage and allow the consumption of material to be reduced by approximately 25 to 30% with at least equal performance.

I claim:

1. In a process for the manufacture by coextrusion of plastic pipe having a composite structure formed of inner and outer walls of plastic material enclosing an intermediate layer of a filling material which is synthetic plastic or polymeric in nature and which adheres to said walls comprising introducing the material constituting said pipe walls in a heated and plastic state, separating the introduced plastic material into two distinct streams, injecting the filling material in a plastic state to between the separated streams of material constituting the inner and outer walls, bringing the three streams into a contacting relation with the stream of filling material sandwiched between the streams forming the inner and outer walls to form a composite having the final structure, the improvement comprising passing the sandwiched streams through a divergent passageway to form the sandwiched streams to a dimension greater than the final dimension of the product, separating the sandwiched streams into circumferentially separated streams, passing the separated sandwiched streams through a convergent passageway and die for rejoinder of said separated streams and to form a homogeneous pipe to final dimension.

2. A process as claimed in claim 1 in which the divergent passageway is a frustoconical passage through which the sandwich stream is passed.

3. A process as claimed in claim 1 in which the convergent passageway is a frustoconical passage through which the separated sandwiched streams are passed for rejoinder.

4. A process as claimed in claim 1 in which the separation is carried out in the form of a trefoil in which the composite is subdivided axially into three circumferentially separated ribbons.

5. A process as claimed in claim 1 in which the filling material is an expandable porous material.

6. An apparatus for the manufacture by coextrusion of plastic pipe having a composite structure formed of inner and outer walls of plastic material with a layer of filling material in between, comprising:
   (a) a heated and regulated distribution head,
   (b) a first extruder for introduction of the material constituting the inner and outer walls in a plastic state into said head,
   (c) a second extruder for introduction of a synthetic plastic or polymeric filling material into said distribution head,
   (d) means within said distribution head for separating the material introduced by the first extruder into two distinct streams,
   (e) means within said distribution head for guiding the filling material into a stream between said streams of wall material, (f) means for bringing the three streams together into contacting relation to form a continuous composite stream in the form of a sandwich with the filling material and wall material in their final arrangement, (g) a divergent passageway of conical shape in communication with the outlet of said distribution head wherein the sandwiched streams increase in dimension during passage therethrough, (h) a convergent passageway as a continuation of the divergent passageway, (i) a trefoil between said divergent and convergent passageways to separate the expanded sandwiched streams into circumferential segments before passage through the convergent passageway for rewelding the segments, (j) a heated and regulated tool downstream of said passageways and in communication therewith to give the sandwiched streams their final shape and dimension.

7. An apparatus as claimed in claim 6 in which the divergent passage comprises a frustoconical member.

8. An apparatus as claimed in claim 6 in which the convergent passage comprises a frustoconical member.

* * * * *